June 18, 1940.  J. SLEPIAN  2,205,225

DISCHARGE DEVICE

Filed March 5, 1938

WITNESSES:
O.J. Fitzgerald
R.W. Bailey

INVENTOR
Joseph Slepian.
BY F.W. Lyle.
ATTORNEY

Patented June 18, 1940

2,205,225

UNITED STATES PATENT OFFICE 2,205,225

DISCHARGE DEVICE

Joseph Slepian, Pittsburgh, Pa., assignor to Westinghouse Electric & Manufacturing Company, East Pittsburgh, Pa., a corporation of Pennsylvania Application March 5, 1938, Serial No. 194,132

2 Claims. (Cl. 250—27.5)

My invention relates to discharge devices, and especially to discharge devices having an arc discharge.

An object of my invention is to clean up any organic vapors which may be present in an electric discharge device.

Figure 1:
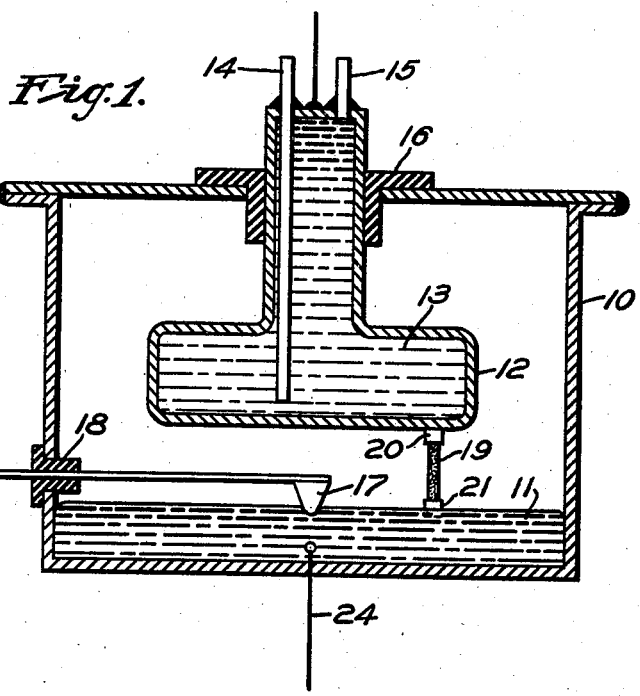
Figure 2:
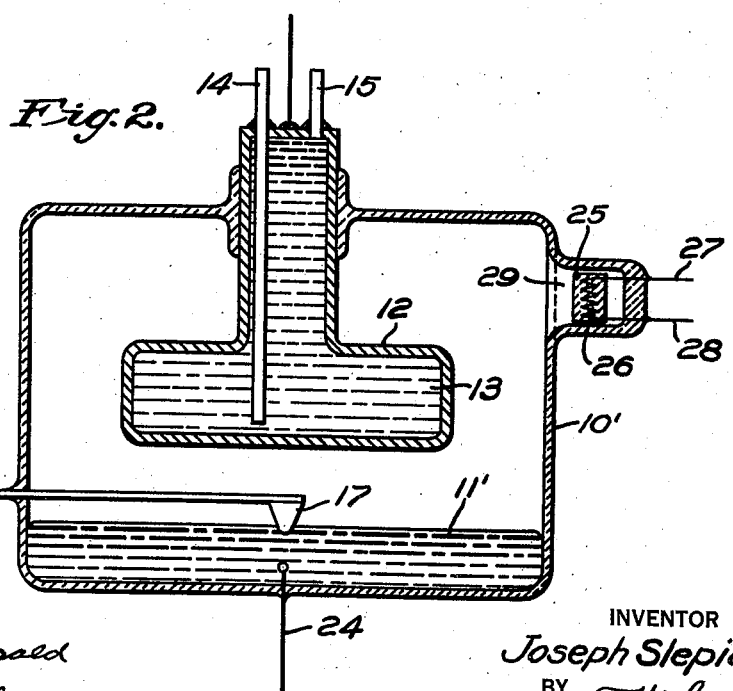

Other objects and advantages of the invention will be apparent from the following description and drawing, in which:

Figures 1 and 2 are cross-sectional views of discharge devices embodying two modifications of my invention.

Discharge devices are very carefully exhausted of air in order that a vacuum or a pure mercury vapor may be contained therein without contamination by gases or other vapors. The pumping system for evacuating such devices generally has rubber connections and also utilizes grease with the result that organic vapors are apt to be present inside of the device.

Organic vapors are know to polymerize into stable solids and liquids under the influence of an electric discharge. I believe that backfires on electrodes in mercury arc devices and the like may be due to the formation of insulating thin films of the polymerized vapor on the backfiring electrode. My invention concerns the continued strong clean-up of any organic vapors which may be present in the device and thus prevent the formation of these thin films of polymerized vapor on the electrode.

In particular, my invention concerns including a porous ceramic body placed in the device and heated at a red heat, or higher, to break up or "crack" the organic vapors which come into contact with it. Carbon will be formed in the pores of the cerramic body as a result of this breaking up or "cracking" of the organic vapor.

In Fig. 1, I have disclosed a cross-sectional view of a familiar type of arc discharge device which has a metal vacuum-tight container 10 which forms, in this instance, a container for the cathode 11 in the shape of a mercury pool. The anode 12 is preferably of the type having a liquid 13 circulated therethrough by inlet and outlet pipes 14 and 15. Insulation 16 seals the anode to the metallic container and also electrically separates it from the cathode. I have also disclosed the familiar make-alike construction 17 sealed through the insulation 18 inserted and sealed to the container 10.

Extending between the anode and cathode is a ceramic body 19 which may consist of a porous ceramic body with sufficient carbon inserted in its pores to provide a sufficiently high resistance path from the anode to the cathode to maintain the ceramic material at a red heat to "crack" or break up any organic vapor in the discharge device. This body is preferably in the form of a resistor formed of a clay mixed with lamp black and fired at a suitable high temperature. A suitable metal 20 fastens the ceramic body 19 to the anode and a similar metallic body 21 makes contact with the mercury pool.

In Fig. 2, I have disclosed similar elements of a discharge device, but in this case I have disclosed the ceramic material as a body 25 having an electric heater 26 embedded therein with leads 27 and 28 to the exterior of the device. The container 10' in this device has been disclosed as that of insulating material, preferably glass, and the mercury pool 11' has a cathode connection 24 thereto. The ceramic material 25 with its embedded electric heater, preferably occupies a pocket 29 disposed outside of the direct discharge path between the anode and cathode.

I have also discovered that a small amount of carbon monoxide gas is liberated by the heated ceramic material and the action of the device is improved thereby. My invention also includes the production of beneficial carbon gas in the device.

It is apparent that many modifications may be made in the preferred embodiments disclosed on the drawing and, accordingly, I desire only such limitations to be imposed upon the following claims as are necessitated by the prior art.

I claim as my invention:

1. A discharge device comprising a container, an anode and cathode therein and a ceramic body extending from said anode to said cathode, said body being sufficiently conductive to be heated to a substantial temperature by current-flow therein.

2. A discharge device comprising a container, an anode and a pool of mercury therein and a ceramic body extending from said anode to said pool of mercury, said body being sufficiently conductive to be heated to a substantial temperature by current-flow therein.

JOSEPH SLEPIAN.